(12) United States Patent
Choi

(10) Patent No.: US 10,244,092 B2
(45) Date of Patent: Mar. 26, 2019

(54) ELECTRONIC DEVICE AND METHOD FOR CONTROLLING THE SAME

(71) Applicant: Samsung Electronics Co., Ltd., Gyeonggi-do (KR)

(72) Inventor: Yeon-Kyu Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/805,567

(22) Filed: Nov. 7, 2017

(65) Prior Publication Data
US 2018/0131797 A1    May 10, 2018

(30) Foreign Application Priority Data
Nov. 8, 2016    (KR) .......................... 10-2016-0148088

(51) Int. Cl.
*H04M 3/42* (2006.01)
*H04M 1/2745* (2006.01)
*H04L 12/58* (2006.01)
*H04M 1/725* (2006.01)

(52) U.S. Cl.
CPC ...... *H04M 1/274533* (2013.01); *H04L 51/04* (2013.01); *H04M 1/274508* (2013.01); *H04M 1/72547* (2013.01); *H04M 1/72552* (2013.01)

(58) Field of Classification Search
CPC .............................................. H04M 1/274533
See application file for complete search history.

(56) References Cited

U.S. PATENT DOCUMENTS

| 2005/0165893 | A1* | 7/2005 | Feinberg ............... G06F 11/302 709/205 |
| 2007/0286366 | A1 | 12/2007 | Deboy et al. |
| 2011/0053570 | A1* | 3/2011 | Song ................. H04M 1/27455 455/414.1 |
| 2013/0185220 | A1* | 7/2013 | Good ..................... G06Q 50/01 705/329 |
| 2015/0074254 | A1 | 3/2015 | Vinner |
| 2015/0326510 | A1 | 11/2015 | Tomlinson et al. |

FOREIGN PATENT DOCUMENTS

| EP | 2 712 148 A1 | 3/2014 |
| KR | 10-2010-0018285 A1 | 2/2010 |
| KR | 10-1508377 B1 | 4/2015 |

OTHER PUBLICATIONS

"Whats App's New Status Feature", Feb. 18, 2015, pp. 1-2, XP055458504, SocialVive, URL:http://socialvive.co.in/whatsapps-new-status-feature/[retrieved on Mar. 12, 2018] *the whole document*.
European Search Report; dated Apr. 5, 2018.
European Search Report dated Oct. 23, 2018.

* cited by examiner

*Primary Examiner* — Justin Y Lee
(74) *Attorney, Agent, or Firm* — Cha + Reiter, LLC.

(57) ABSTRACT

An electronic device is disclosed. The electronic device includes a display, a memory, and a processor electrically connected with the display and the memory, wherein the processor controls to display, on the display, a directory comprising at least one contact list stored in the memory, and controls to identify a selected contact among the contact list based on an external input signal, and receive information to be displayed to the selected contact, and match and store the selected contact and the received information.

10 Claims, 14 Drawing Sheets

ELECTRONIC DEVICE AND METHOD FOR CONTROLLING THE SAME

CLAIM OF PRIORITY

This application claims priority under 35 U.S.C. § 119(a) to a Korean Patent Application Serial No. 10-2016-0148088, which was filed in the Korean Intellectual Property Office on Nov. 8, 2016, the content of which is incorporated herein by reference.

BACKGROUND

1. Field of the Invention

The present disclosure relates to an electronic device and, more particularly, relates to an electronic device differently implementing displayed information depending on a counterpart included in a contact.

2. Description of the Related Art

Electronic devices such as the latest smartphones include various functions in addition to traditional voice telephony, such as message sending/receiving, video telephony, e-mail sending/receiving, and the Internet.

An electronic device can include a list of friends for calling, emailing, or texting.

Disadvantages and limitations of traditional systems will be appreciated through comparison of traditional systems with rest of the present application.

SUMMARY

A phrase that a user has written in a self introduction of a messenger application can be shown to all contacts who contact the user by using the same messenger application as the user. Accordingly, the phrase that the user has written can be seen for all contacts, irrespective of user's intent.

Accordingly, the user can feel the necessity of intending to show a certain phrase that the user has written, only to a specific contact.

An electronic device according to one embodiment includes a display; a memory; and a processor electrically connected with the display and the memory, wherein the processor controls to display, on the display, a directory comprising at least one contact list stored in the memory, and controls to identify a selected contact among the contact list based on an external input signal, and receive information to be displayed to the selected contact, and match and store the selected contact and the received information.

An electronic device according to another embodiment includes a display; a memory; and a processor electrically connected with the display and the memory, wherein the processor controls to receive information which has been inputted such that a contact corresponding to an external electronic device is displayed on the display of the electronic device, and display the received information when displaying a list of contacts, stored in the memory, comprising the contact corresponding to the external electronic device on the display.

In accordance with an another embodiment, a non-transitory recording medium for storing instructions of performing an electronic device control method, stores instructions comprising: displaying a directory comprising at least one contact; identifying a selected contact among the at least one contact based on an external input signal; and based on receiving information to be displayed to the selected contact, matching and storing the selected counterpart and the received information.

DETAILED DESCRIPTION

Figure 1:
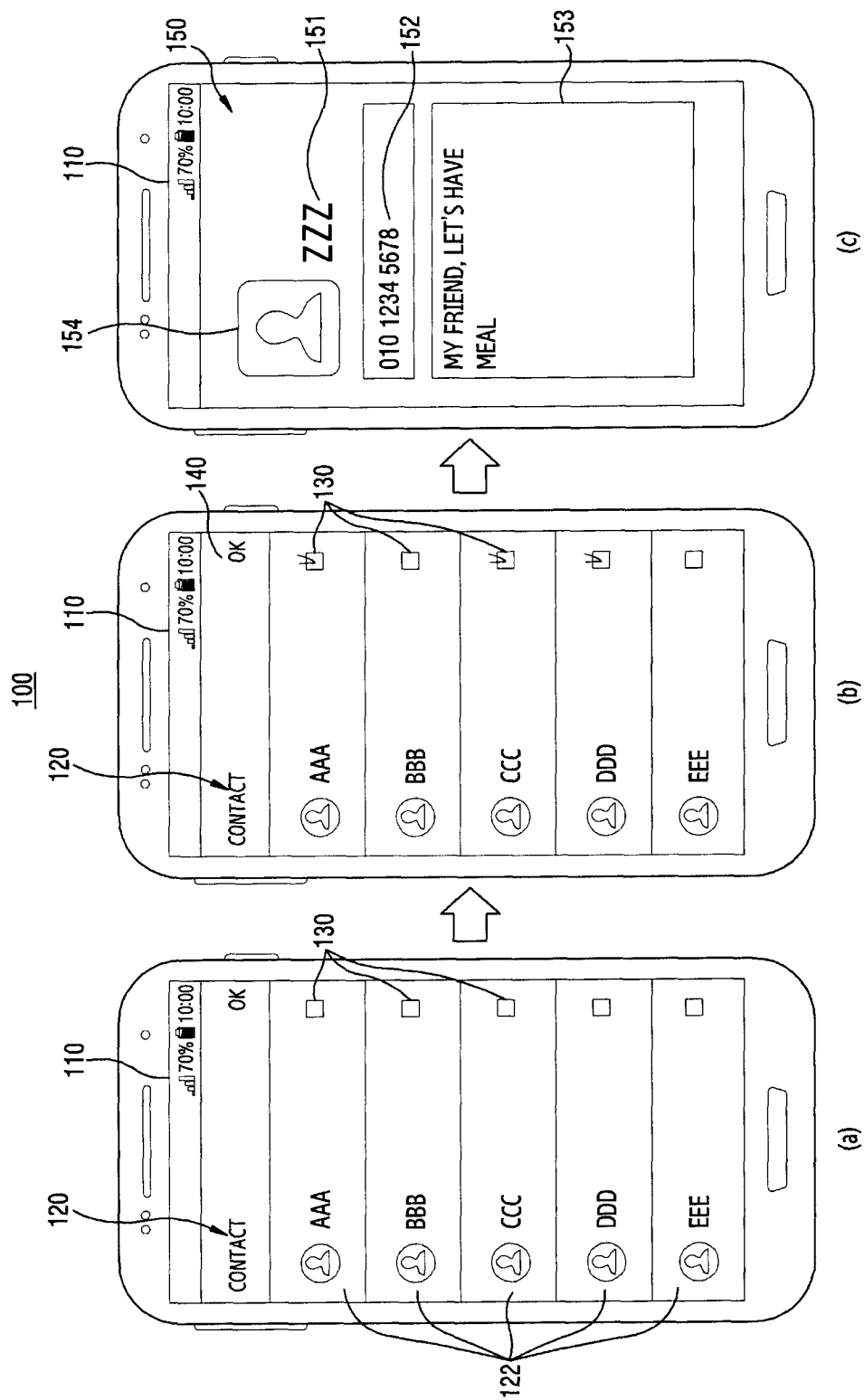
FIG. 1 is diagrams for explaining a process of selecting some counterparts among a contact and inputting user's information desired to be displayed to the selected counterparts in an electronic device according to an embodiment of the present disclosure.

Various exemplary embodiments of the present document are mentioned below with reference to the accompanying drawings. An exemplary embodiment and the terms used for this do not intend to limit the technology mentioned in the present document to a specific embodiment form, and should be construed as including various changes of the corresponding exemplary embodiment, equivalents thereof, and/or alternatives thereof. In relation to a description of the drawing, like reference symbols may denote like constituent elements. The expression of a singular form may include the expression of a plural form unless otherwise dictating clearly in context. In the present document, the expressions "A or B", "at least one of A and/or B" or the like may include all available combinations of words enumerated together. The expressions "a first", "a second", "the first", "the second", etc. may modify corresponding constituent elements irrespective of order and/or importance, and are just used to distinguish one constituent element from another constituent element and do not limit the corresponding constituent elements. When it is mentioned that any (e.g., first) constituent element is "(operatively or communicatively) coupled with/to" or is "connected to" another (e.g., second) constituent element, the any constituent element can be directly coupled to the another constituent element, or be coupled through a further constituent element (e.g., a third constituent element).

In the present document, the expression "configured (or set) to~" may be used interchangeably with, for example, "suitable for~", "having the capacity to~", "adapted to~", "made to~", "capable of~" or "designed to~" in a hardware or software manner in accordance to circumstances. In some context, the expression "device configured to~" may represent that the device is "capable of ~" together with other devices or components. For example, the phrase "processor configured (or set) to perform A, B, and C" may represent a dedicated processor (e.g., embedded processor) for performing a corresponding operation, or a generic-purpose processor (e.g., a central processing unit (CPU) or an application processor (AP)) capable of performing corresponding operations by executing one or more software programs stored in a memory device.

FIG. 1 are block diagrams describing selection of counterparts of a contact and inputting user information desired to be displayed to the selected counterparts in an electronic device according to an embodiment of the present disclosure.

Referring to FIG. 1, the electronic device 100 according to an exemplary embodiment may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an MPEG-1 audio layer-3 (MP3) player, a medical device, a camera, or a wearable device. The wearable device may include at least one of an accessory type (e.g., a watch, a ring, a wristlet, an anklet, a necklace, glasses, contact lens, or head-mounted-device (HMD)), fabric or clothing integral type (e.g., electronic clothes), human-body mount type (e.g., a skin pad or tattoo), or bio implantation type circuit. A description is made below on the assumption that the electronic device is the smartphone.

Referring to FIG. 1(a), the electronic device 100 may display a directory 120 of contacts 122 from a directory application on a display 110. The directory application can be used in conjunction with many communication applications provided by the electronic device. The communication applications allow the user of the electronic device 100 to communicate with other known persons, and can includes, among other applications, traditional voice telephony, text messaging, email, to name a few. Generally, the known persons are associated with certain numbers or addresses, such as phone numbers, email addresses, IP addresses, web pages, etc. The contacts 122 may, for example, display a phone number, an e-mail address or the like which has been stored in a list form. The directory 120 may be an application which is installed during manufacture of the electronic device 100.

According to another embodiment, the directory 120 may be a counterpart list which is generated in a messenger application or social network services (SNS) application that a user of the electronic device 100 downloads and installs. For example, the messenger application downloaded from an external server and installed by the user may be installed in the electronic device 100 while generating the directory 120 including people having relation with the user, who have installed the same messenger application. For example, the messenger application can include WhatsApp, or Facebook Messenger.

According to an exemplary embodiment of the present disclosure, the user may select at least one or more contacts 122 among a list of contacts 122.

Referring to FIG. 1(b), the user may select a desired counterpart by selecting a check box 130 displayed in the list of contacts 122. However, a method in which the user selects the desired counterpart is not limited to this, and can include other ways of selecting the counterpart. For example, the user of the electronic device 100 can select a desired contact among the list of contacts 122, the selected contact 122 may be displayed in a different color or the selected contact 122 may be displayed in a bold font.

When the display 110 of the electronic device 100 supports a touch input, the user may select a desired counterpart by selecting a region in which the check box 130 is positioned. Also, when the display 110 of the electronic device 100 does not support the touch input, the user may a desired counterpart by using a separate physical key (e.g., a cross button, a wheel button, etc.). If the user selects "OK" 140 after selecting all of desired counterparts, the electronic device 140 may proceed to a step of modifying user's information.

According to an exemplary embodiment of the present disclosure, by using a first user interface 150, a user may input information of the user himself displayable in an external electronic device corresponding to a selected counterpart.

Referring to FIG. 1(c), the electronic device 100 may display the first user interface 150 capable of modifying information to be stored as a match with selected contact(s). The first user interface 150 may display a user name 151, a user phone number 152, a region 153 for inputting a phrase shown to a contact, and a region 154 for inputting an image shown to the contact.

According to an embodiment, the electronic device 100 may display, for example, a text input user interface of inputting a text, based on an input signal selecting the region 153 for inputting the phrase shown to the contact. By using the text input user interface, a user may input a phrase intended to be displayed to a selected counterpart. For example, the user may input a phrase "My Friend, Let's Have Meal".

The foregoing message can appear in an electronic terminal associated with the contact. In certain embodiments, the contact owns/possesses an electronic device (contact's electronic device). The contact's electronic device can similarly include a directory that includes a contact for the user of the electronic device 100. When the contact for the user of the electronic device 100 is displayed at the contact's electronic device, the contact for the user of the electronic device 100 will display the information entered in region 153.

According to another exemplary embodiment, the electronic device 100 may display an image list capable of being stored in the region 154 for changing the image shown to the counterpart, based on an input signal of selecting the region 154 for inputting the image shown to the counterpart. For example, the electronic device 100 may execute a gallery application. However, an exemplary embodiment is not limited to this.

The electronic device 100 may execute a server or another application that is previously associated with the region 154 for inputting an image intended to be displayed. Also, the electronic device 100 may store an image captured by executing a camera application, in the region 154 for inputting the image shown to the counterpart.

When the electronic device 100 displays the gallery application, the user may select an image intended to be displayed in an external electronic device of a selected counterpart, among at least one or more images displayed.

The foregoing image can appear in an electronic terminal associated with the contact. The contact's electronic device can similarly include a directory that includes a contact for the user of the electronic device 100. When the contact for the user of the electronic device 100 is displayed at the contact's electronic device, the contact for the user of the electronic device 100 will display the image entered in region 154.

As above, according to various exemplary embodiments of the present disclosure, the user may modify and input information of the user himself intended to be displayed only to a desired counterpart. Due to this, the selected counterpart may identify the user's information with a user's modified phrase and/or image.

Figure 2:
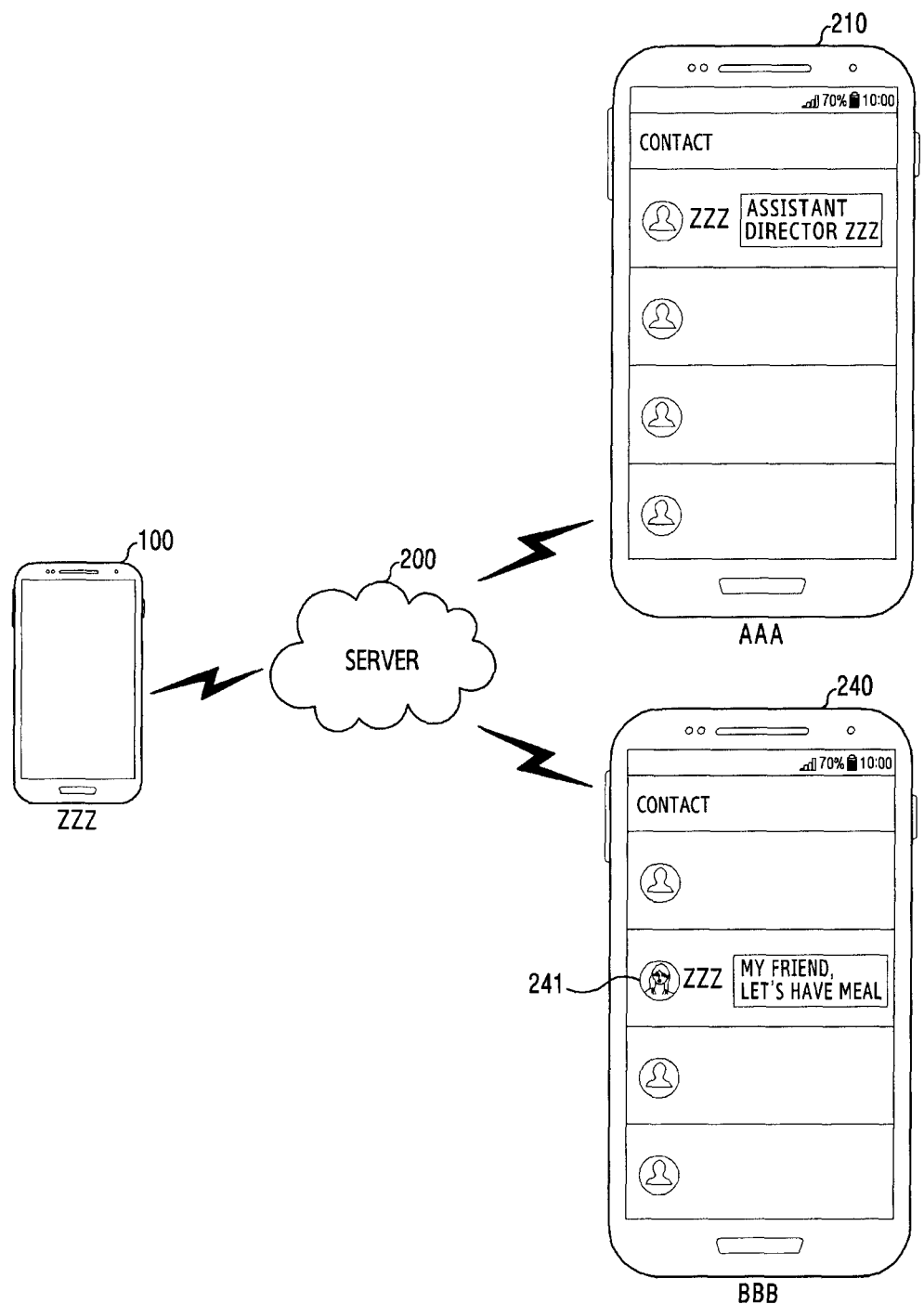
FIG. 2 is a diagram for explaining a situation in which each of external electronic devices displays mutually different information when an electronic device selects a counterpart and changes user's information according to an embodiment of the present disclosure.

FIG. 2 is a block diagram for describing external electronic devices displaying mutually different information when an electronic device selects a contact and changes the user's information according to an embodiment of the present disclosure.

Suppose for example, that user "ZZZ" at electronic device 100 selects contact "AAA" (user/owner of device 210) and enters "Assistant Director ZZZ" in region 153. Additionally, user "ZZZ" at electronic device selects contact "BBB" (user/owner of device 240) and enters "My Friend, Let's Have Meal" in region 153, and image 241 in region 154. In the directory of the electronic device 210 used/owned by "AAA", "Assistant Director ZZZ" will appear with the contact for "ZZZ." In the directory of the electronic device 240 used/owned by "BBB", "My Friend, Let's Have Meal" and image 241 will appear with the contact for "ZZZ."

Referring to FIG. 2, a network may include the electronic device 100, a server 200, a first external electronic device 210, and a second external electronic device 240. By using wired or wireless communication, the electronic device 100 may communicate with the server 200, the first external electronic device 210, and the second external electronic device 240.

According to an exemplary embodiment, any of the electronic device 100, the first external electronic device 210 and the second external electronic device 240 may be disconnected on the one network described above, and may be again connected. That is, the aforementioned electronic devices 100, 210, and 240 may be all connected to the network at the same time or in some cases, only some of the electronic devices 100, 210 or 240 may be connected to the network. For example, only the electronic devices having executed the messenger application described earlier in FIG. 1 may temporarily form the aforementioned network.

The wireless communication may, for example, include a cellular communication that utilizes at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) or the like. Also, the wireless communication may include a short-range communication method such as Bluetooth, near field communication (NFC), etc. The wired communication may, for example, include at least one of a universal serial bus (USB), a high definition multimedia interface (HDMI), etc.

According to an exemplary embodiment, the electronic device 100 may provide modified information with selected contact information, and make the matching result into one data frame, and transmit the one data frame to the server 200. For example, data that the electronic device 100 transmits to the server 200 may, for example, include a phone number of a user, a phone number of a selected contact, and the modified information.

In detail, the electronic device 100 may transmit, to the server 200, data comprising a phone number of a user (that is, the phone number of the electronic device 100), a phone number of the first external electronic device 210, and the user's modified information, such as "assistant director ZZZ". Also, the electronic device 100 may transmit, to the server 200, data comprising a phone number of the user (that is, the phone number of the electronic device 100), a phone number of the second external electronic device 240, and another user's modified information, such as "My Friend, Let's Have Meal".

The server 200 may store all of contact information that have been stored in each of the electronic devices 100, 210 and 240 having installed the messenger application described earlier in FIG. 1. By using the data received from the user, the server 200 may update the directories of each of the electronic devices 100, 210 and 240 stored in the server 200. The server 200 may transmit the updated contact information to each of the electronic devices 100, 210 and 240. The server 200 may transmit only updated content among the contact information to the electronic devices 100, 210 and 240, or may transmit the entire updated contact information to the respective electronic devices 100, 210 and 240 as well.

For example, if the first external electronic device 210 or the second external electronic device 240 executes the messenger application described earlier in FIG. 1, the messenger application may communicate with the server 200, to receive each of updated contact information stored in the server 200 and update, by the received contact information, information on a user of the electronic device 100 previously stored in the first external electronic device 210 and the second external electronic device 240.

Also, according to another embodiment, the messenger application may receive only each of contents corresponding to the first data and the second data, and update, by the received contents, information on a user of the electronic device 100 previously stored in the first external electronic device 210 and the second external electronic device 240.

In detail, the first external electronic device 210 may reflect, instead of the existing information on the user of the electronic device 100, the first data that the user has inputted for the first external electronic device 210, and display a phrase "assistant director ZZZ" as the information on the user.

Also, the second external electronic device 240 may reflect, in place of the existing information on the user of the electronic device 100, the second data that the user has inputted for the second external electronic device 240, and display a changed image 241 and a phrase "My friend, Let's Have Meal" as the information on the user.

According to an exemplary embodiment, the first external electronic device 210 and the second external electronic device 240 may store the existing stored information on the user for the purpose of future reuse.

As above, a user may set information which may be shown only to an external electronic device of a desired counterpart. Owing to this, the user may adaptively display information of the user himself depending on a counterpart.

Figure 3:
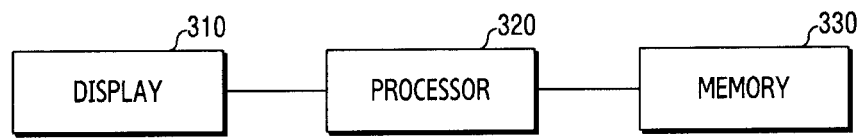
FIG. 3 is a schematic block diagram of an electronic device according to an embodiment of the present disclosure.

FIG. 3 is a block diagram of an electronic device 300 according to an embodiment of the present disclosure.

Referring to FIG. 3, the electronic device 100 may include a display 310, a processor 320, and a memory 330. The foregoing elements illustrated in FIG. 3 are not essential, so the electronic device 100 according to an embodiment may be implemented to have additional elements than the constitutional elements illustrated in FIG. 3 or less elements. For example, the electronic device 100 may include an input module (e.g., a touch panel, a physical key, a proximity sensor, a medical sensor, etc.), a power supply unit or the like.

The display 310 may, for example, include a liquid crystal display (LCD), a light emitting diode (LED) display, an organic light emitting diode (OLED) display, or a microelectromechanical systems (MEMS) display, or an electronic paper display. The display 310 may be the display 110 of FIG. 1. The display 310 may include a touch screen and, for example, may receive a touch, gesture, proximity, or hovering input that uses an electronic pen or a part of the user's body.

The display 310 according to an embodiment of the present disclosure may display a contact based on control of the processor 320, and may identify a selection of a counterpart that a user desires among a plurality of contacts included in the directory based on a touch, etc. utilizing an electronic pen or a part of the user's body. Also, the display 310 may display a first user interface capable of inputting a phrase, an image, etc. displayable in an external electronic device corresponding to the selected counterpart, based on control of the processor 320.

The processor 320 may, for example, operate an operating system or an application program, to control a majority of hardware or software constituent elements connected to the processor 320, and may perform various data processing and operations.

The processor 320 according to an embodiment of the present disclosure may display a directory (or a portion thereof) on the display 310, based on user's signal input, and identify a contact that a user desires among a displayed contact list. Also, the processor 320 may display, on the display 310, the first user interface of controlling a phrase, an image, etc. displayable in an external electronic device corresponding to the selected contact.

The memory 330 may include a volatile and/or non-volatile memory. The memory 330 may, for example, store a command or data related to at least one another constituent element of the electronic device 100.

The memory 330 according to an embodiment of the present disclosure may store a directory including contacts which have been generated based on a user's input. Also, the memory 330 may match a particular one of the contacts selected by a user with a phrase or image inputted by the user, and store the matching result, and transmit the phone number of the electronic device 300, the phone number of the contact, and the phrase or image input by the user to a server.

An electronic device 100 according to an embodiment may include a display 310, a memory 330, and a processor 320 electrically connected with the display 310 and the memory 330. The processor 320 may control to display, on the display 310, a directory, portion thereof, or plurality of contacts stored in the memory 330, and control to identify a selected contact among the contact list based on an external input signal, and receive information to be displayed to the selected counterpart, and match and store the selected contact and the received information.

In the electronic device 100 according to an embodiment, the processor 320 may control to display a part of the at least one contact list in one group.

In the electronic device 100 according to an embodiment, the processor 320 may identically match the information to be displayed to the contact with contacts belonging to the one group, and store the matching result.

In the electronic device 100 according to an embodiment, the received information may be at least one of an image and a phrase which are shown to an external electronic device corresponding to the selected contact.

In the electronic device 100 according to an embodiment, the processor 320 may generate the information to be displayed to the contact, by using information previously stored for a user of the electronic device.

In the electronic device 100 according to an embodiment, the processor 320 may receive and store a period for matching and storing the received information and the selected contact.

An electronic device 100 according to an exemplary embodiment may include a display 310, a memory 330, and a processor 320 electrically connected with the display 310 and the memory 330. The processor 320 may control to receive information which has been inputted such that a contact corresponding to an external electronic device is displayed on the display of the electronic device, and display the received information when displaying a contact, stored in the memory, including the contact corresponding to the external electronic device on the display.

In the electronic device 100 according to an embodiment, the processor 320 may receive the information from the external electronic device, or receive the information from another electronic device which has received the information from the external electronic device.

In the electronic device 100 according to an embodiment, the processor 320 may control to display both the received information and information, previously stored in the memory, on the contact corresponding to the external electronic device, together.

In the electronic device 100 according to an embodiment, the information may further include a period displayed in the electronic device, and the processor 320 may control to display the received information in the contact during the period inputted by the contact corresponding to the external electronic device.

In the electronic device 100 according to an embodiment, when further displaying detailed information on the contact corresponding to the external electronic device included in the contact, the processor 320 may control to display both the received information and information, previously stored in the memory, on the contact corresponding to the external electronic device, together.

In the electronic device 100 according to an embodiment, when newly adding, to the contact, information of the contact corresponding to the external electronic device, the processor 320 may control to receive information having been inputted such that the counterpart corresponding to the external electronic device is displayed in the electronic device, and display the received information in the contact.

Figure 4:
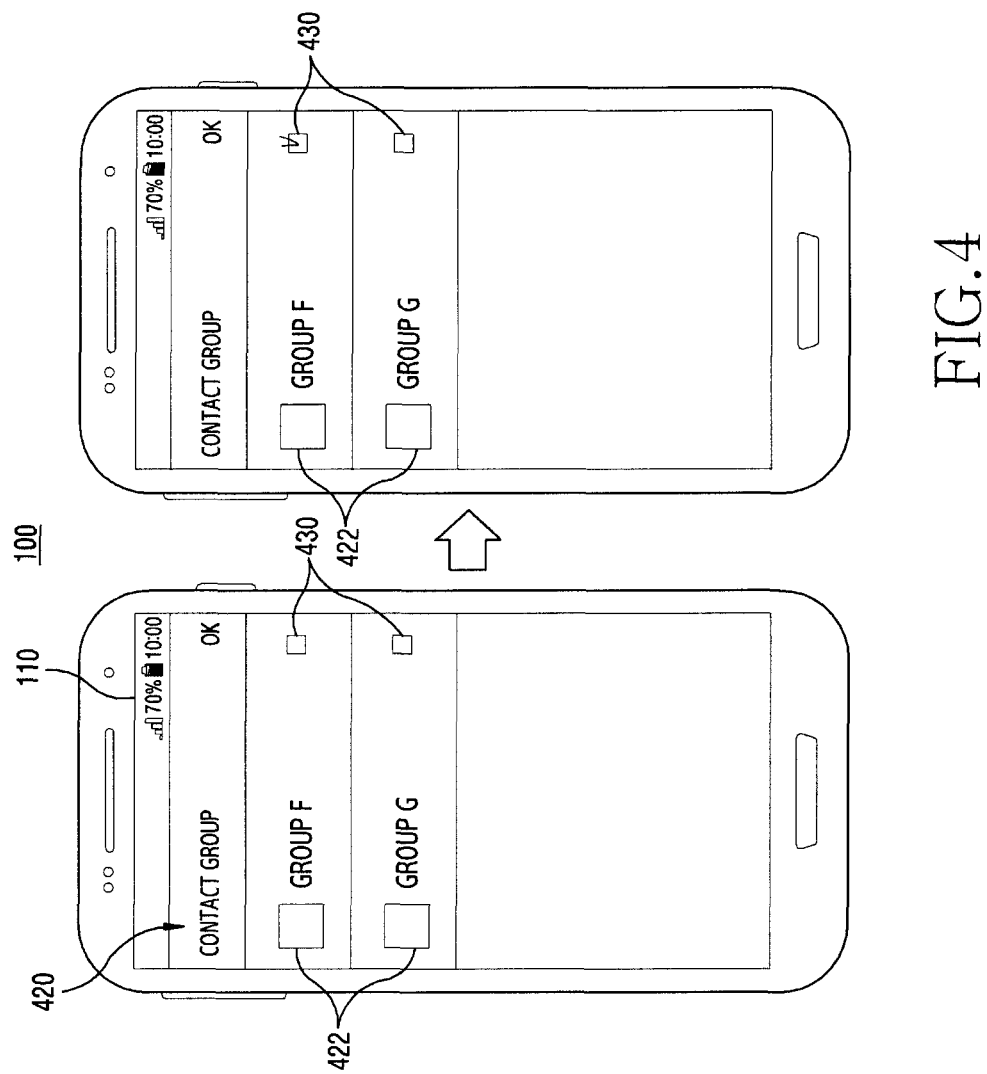
FIG. 4 is diagrams for explaining a situation of displaying a contact list in a group, and displaying a counterpart selected by a user of an electronic device in the electronic device according to an embodiment of the present disclosure.

FIG. 4 is diagrams for explaining a situation of displaying a contact list in a group, and displaying a group selected by a user of an electronic device in the electronic device according to an exemplary embodiment of the present disclosure.

Referring to FIG. 4(a), the electronic device 100 may display a directory 420 on the display 110. The directory 420 displayed in FIG. 4(a) may include a plurality of contact groups 422. Each of the contact groups 422 may further include a plurality of contacts.

The contact groups 422 may be, for example, displayed in a list form. The group may be, for example, the form of binding a plurality of personal contacts into one. A user may select at least one or more groups among a group list 422 displayed in the directory 420.

The user may select a desired group by selecting a check box 430 displayed in the group list 422. However, a method in which the user selects the desired group is not limited to this.

According to an embodiment, the user may input user's information displayable in an external electronic device corresponding to the selected group by using the first user interface 150 described earlier in FIG. 1.

Figure 5:
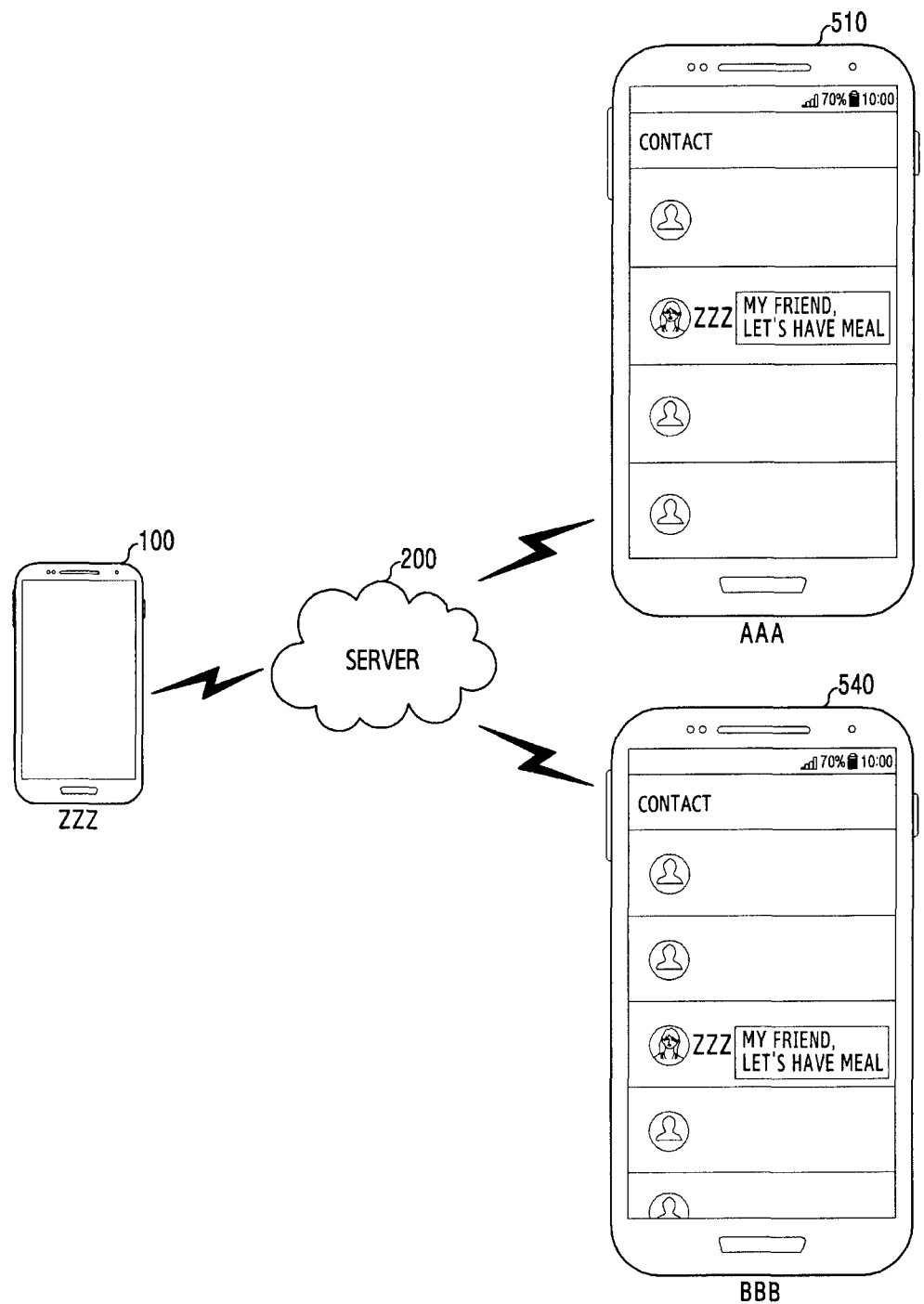
FIG. 5 is a diagram for explaining a situation in which each of external electronic devices displays the same information when an electronic device selects a counterpart group and changes user's information according to an embodiment of the present disclosure.

FIG. 5 is a diagram for explaining a situation in which each of external electronic devices displays the same information when an electronic device selects a contact group and changes user's information according to an embodiment of the present disclosure.

Suppose for example, that user "ZZZ" at electronic device 100 selects a contact group F that includes contacts "AAA" (user/owner of device 510) and "BBB" (user/owner of device 540) and enter "My Friend, Let's Have Meal" in region 153 and an image in region 154. In the directories of the electronic devices 510 used/owned by "AAA" and 240 used/owned by "BBB", "My Friend, Let's Have Meal" and the image 241 will appear with the contact for "ZZZ."

Referring to FIG. 5, a network may include the electronic device 100, the server 200, a first external electronic device 510 and a second external electronic device 540. By using wired or wireless communication, the electronic device 100 may communicate with the server 200, the first external electronic device 510 and the second external electronic device 540 which have been connected to the network.

According to an embodiment, the electronic device 100 may match user's modified information with information of a selected contact group, and make the matching result into one data frame, and transmit the one data frame to the server 200. For example, data that the electronic device 100 transmits to the server 200 may, for example, include a phone number of a user, a phone number of each individual who belongs to the selected contact group, and the user's modified information.

In detail, the electronic device 100 may transmit, to the server 200, third data which is comprised of a phone number, a phone number of the first external electronic device 510 which belongs to a selected counterpart group, a phone number of a user of the second external electronic device 540 which belongs to the selected counterpart group, and a phrase "My Friend, Let's Have Meal" (i.e., user's modified information).

The server 200 may transmit the received third data to the first external electronic device 510 and the second external electronic device 540. For example, if the first external electronic device 510 or the second external electronic device 540 executes the messenger application described earlier in FIG. 1, the messenger application may communicate with the server 200, to receive the third data stored in the server 200 and update, by the received third data, information on the user of the electronic device 100 previously stored in the first external electronic device 510 and the second external electronic device 540.

In detail, the first external electronic device 510 and the second external electronic device 540 may reflect, in place of the existing information on the user of the electronic device 100, the third data that the user has inputted for a group to which the first external electronic device 510 and the second external electronic device 540 belong, and display "My friend, Let's Have Meal" as the information on the user.

As above, the user may set information which may be commonly shown to all of electronic devices of a desired counterpart group. Due to this, the user may adaptively display information of the user themselves depending on a contact group.

Figure 6:
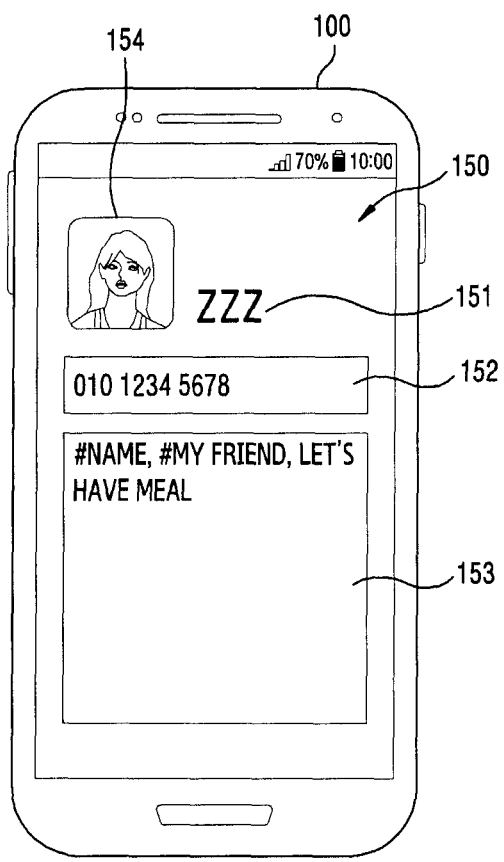
FIG. 6 is a diagram for explaining another exemplary embodiment of inputting a phrase to be stored as a match with selected counterpart information in an electronic device according to an embodiment of the present disclosure.

FIG. 6 is a diagram for explaining another embodiment of inputting a phrase to be stored as a match with a selected contact in an electronic device according to an embodiment of the present disclosure.

Referring to FIG. 6, the electronic device 100 may display the first user interface 150 capable of modifying information to be stored as a match with selected contact information. The first user interface 150 may display user's name 151, user's phone number 152, a region 153 for inputting a phrase shown to a counterpart, and a region 154 for inputting an image shown to the counterpart.

The user's name 151, the user's phone number 152, and the region 154 for inputting the image shown to the counterpart among the constituent elements of the first user interface 150 have been explained in FIG. 1.

According to an embodiment, the electronic device 100 may display, for example, a text input user interface for inputting a text, based on an input signal of selecting the region 153 for inputting the phrase shown to the contact. By using the text input user interface, a user may input a phrase intended to be shown to the selected contact.

For example, the user may input a phrase "#name#, My friend let's have a meal". The electronic device 100 may match the inputted phrase "#name#, My friend let's have a meal" with selected contact information, and store the matching result. Here, the electronic device 100 may recognize a symbol "##", to store the selected contact information together with the phrase "#name#, My friend let's have a meal" inputted by the user of the electronic device 100. The symbol "##" may be a meaning of storing after reading, from the memory 330, user's information corresponding to a text inputted between "#" and "#".

For example, when "name" is inputted between "#" and "#" as in FIG. 6, the electronic device 100 may read information corresponding to a name among user's contacts previously stored in the memory 330, and match the name with a contact selected along with the phrase "My friend, let's have a meal", and store the matching result. According to another exemplary embodiment, when "phone number" is inputted between "#" and "#", the electronic device 100 may read a phone number among the user's contacts previously stored in the memory 330.

Figure 7:
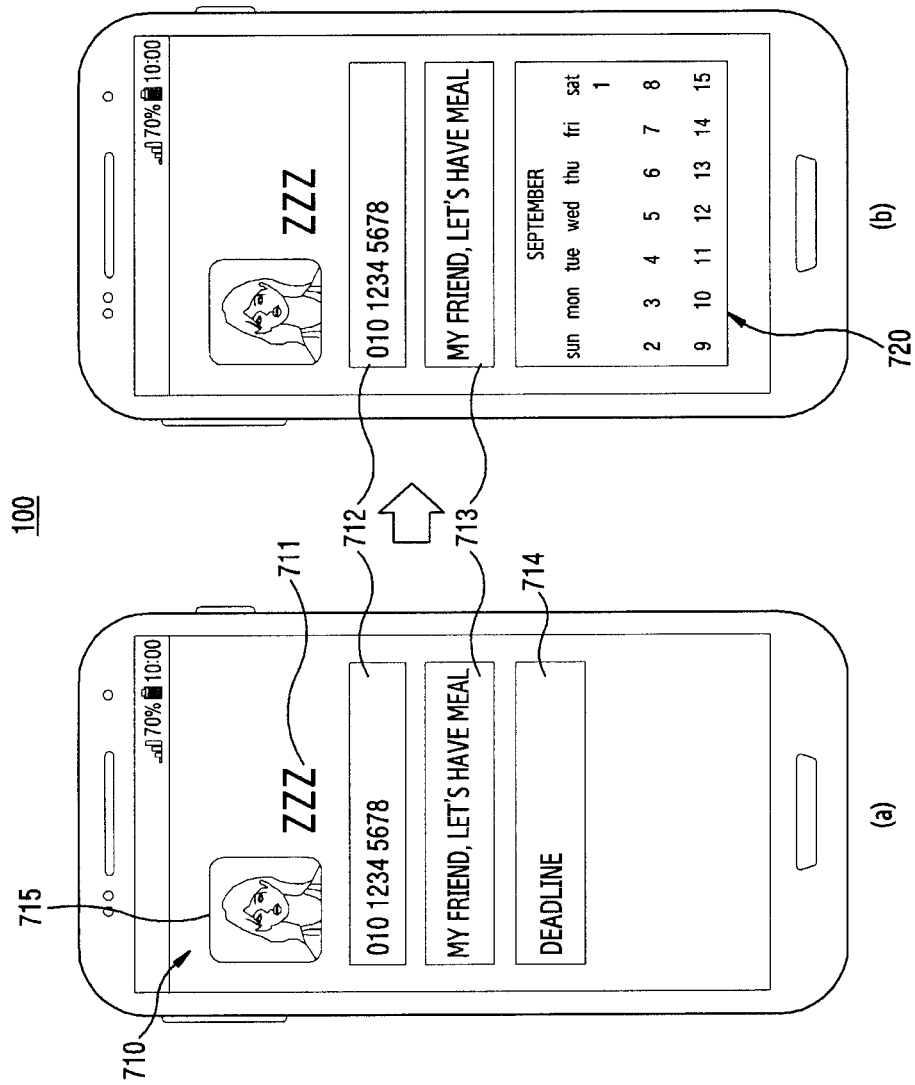
FIG. 7 is diagrams for explaining a situation of fixing a deadline when inputting a phrase to be stored as a match with selected counterpart information in an electronic device according to an embodiment of the present disclosure.

FIG. 7 is diagrams for explaining a situation of fixing a deadline when inputting a phrase to be stored as a match with selected counterpart information in an electronic device according to an exemplary embodiment of the present disclosure.

Referring to FIG. 7(a), the electronic device 100 may display a second user interface 710 capable of modifying information to be stored as a match with selected contact information. The second user interface 710 may display a user's name 711, a user phone number 712, a region 713 for inputting a phrase shown to a counterpart, a region 715 for inputting an image shown to the contact, and a region 714 for inputting a time period for displaying inputted content.

The user's name 711, the user phone number 712, the region 713 for inputting the phrase shown to the counterpart and the region 715 for inputting the image shown to the counterpart among the constituent elements of the second user interface 710 are similar with the first user interface 150 of FIG. 1.

Referring to FIG. 7(b), the electronic device 100 may display a user interface 720 capable of setting a period, based on a user input signal of selecting the region 714 for inputting the time period for displaying the inputted content. For example, the electronic device 100 may display a user interface of a form similar with a calendar.

By using the user interface 720 capable of setting the time period, a user of the electronic device 100 may fix a deadline during which inputted user's information (e.g., at least one of an image and a phrase) is desired to be displayed in an external electronic device of a selected counterpart. During the set time period, the electronic device 100 may match the inputted user's information with the selected contact along with the existing stored user's information, and store the matching result, and transmit the matching result to the server 200.

Accordingly, during the time period, the external electronic device of the contact selected by the user of the electronic device 100 may display the changed user's information and before and after the period, it may display the original user's information.

Figure 8:
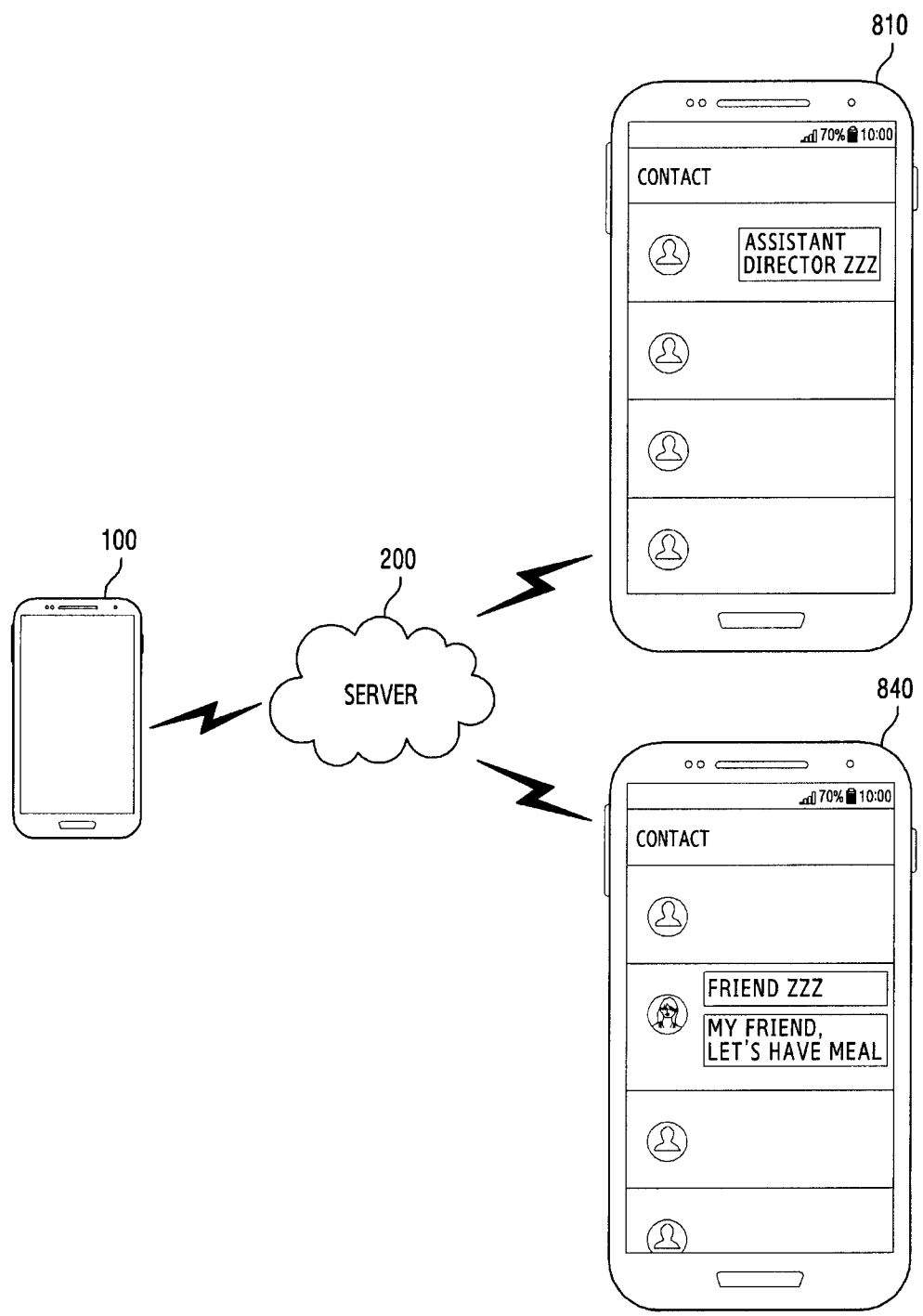
FIG. 8 is a diagram for explaining a situation in which an external electronic device displays a plurality of user's information when an electronic device selects a counterpart and changes user's information according to an embodiment of the present disclosure.

FIG. 8 is a block diagram where an external electronic device displays a plurality of user's information when an electronic device selects a counterpart and changes user's information according to an embodiment of the present disclosure.

Referring to FIG. 8, a network may comprise the electronic device 100, the server 200, a first external electronic device 810, and a second external electronic device 840.

According to an exemplary embodiment, the electronic device 100 may match modified information with selected counterpart information, and make the matching result into one data frame, and transmit the one data frame to the server 200. For example, data that the electronic device 100 transmits to the server 200 may, for example, include a phone number of a user, a phone number of a selected counterpart, and the user's modified information.

In detail, the electronic device 100 may transmit, to the server 200, first data which is comprised of a phone number of a user, a phone number of a user of the first external electronic device 810, and user's modified information, ("assistant director ZZZ"). Also, the electronic device 100 may transmit, to the server 200, second data comprises a phone number of a user, a phone number of a user of the second external electronic device 840, and user's modified information (a phrase "My Friend, Let's Have Meal").

As described above, the server 200 may update, by content included in the first data and/or the second data, contact information of each of the electronic devices 100, 810 and 840 stored in the server 200, and transmit the updated contact information to each of the electronic devices 100, 810 and 840. For example, the server 200 may transmit the received first data to the first external electronic device 810, or transmit the second data to the second external electronic device 840.

According to an embodiment, an external electronic device having received data from the server 200 may display the existing stored information and information included in the received data, together.

The first external electronic device 810 may reflect, in place of the existing information on the user of the electronic device 100, the first data that the user has inputted for the first external electronic device 810, and display a phrase "Assistant Director ZZZ" as information on the user.

The second external electronic device 840 may reflect, together with the existing information on the user of the electronic device 100, the second data that a user has inputted for the second external electronic device 840, thereby concurrently displaying both "Friend ZZZ" and "My friend, Let's Have Meal" as information on the user. That is, the second external electronic device 840 may concurrently display both the existing phrase "Friend ZZZ" that a user of the second external electronic device 840 has inputted as the information on the user of the electronic device 100, and the phrase "My Friend, Let's Have Meal" that the user of the electronic device 100 has inputted as the information on the user of the electronic device 100.

As above, a user may set information which may be shown only to an external electronic device of a desired counterpart. Here, the external electronic device of the counterpart may also display both the existing stored information on the user and newly received information on the user, together.

Figure 9:
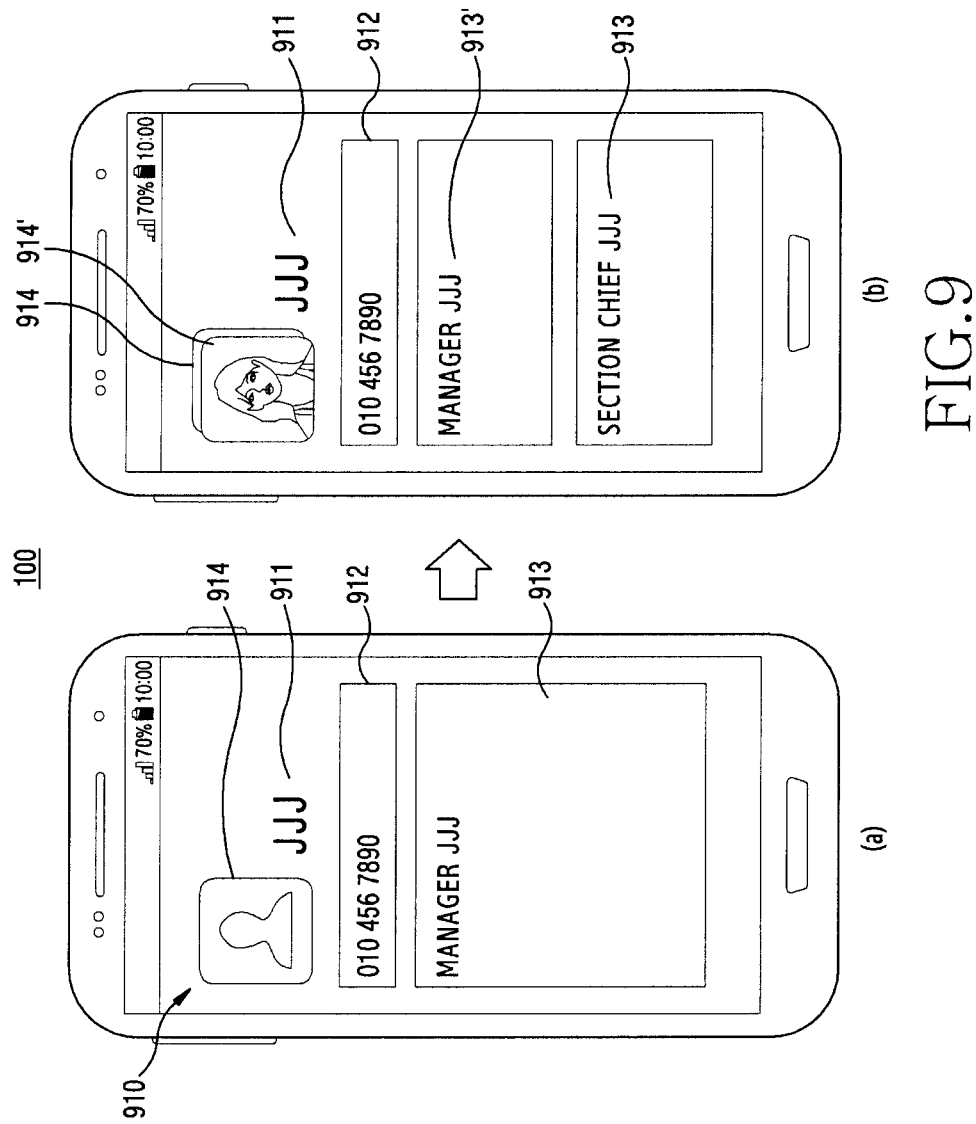
FIG. 9 is diagrams for explaining a situation of changing contact information based on received data in an electronic device according to an embodiment of the present disclosure.

FIG. 9 is a block diagram for describing changing contact information based on received data in an electronic device according to an embodiment of the present disclosure.

Referring to FIG. 9(a), the electronic device 100 may display a third user interface 910 for displaying detailed information of a counterpart stored in a contact. The third user interface 910 may, for example, include a contact image 914, a contact name 911, a contact phone number 912, and a phrase 913 expressed by the contact.

If receiving data including information changed by a contact such as the aforementioned first data or second data from the server 200, the electronic device 100 according to an embodiment may add the information to the third user interface 910, or change the information to display the changed information.

Referring to FIG. 9(b), the electronic device 100 may display detailed information of a contact received from the server 200.

According to an embodiment, the electronic device 100 may display a contact image 914' received from the server 200. For example, the electronic device 100 may superpose the received contact image 914' on the existing image 914 and display the received contact image 914'.

Also, the electronic device 100 may display a phrase 913' input by the contact and received from the server 200. For example, the electronic device 100 may display the received phrase 913' input by the contact, concurrently or sequentially with an existing phrase 913 input by the contact.

As above, according to an embodiment of the present disclosure, a user may concurrently identify both contact information stored by the user themselves and information directly inputted by a contact.

Figure 10:
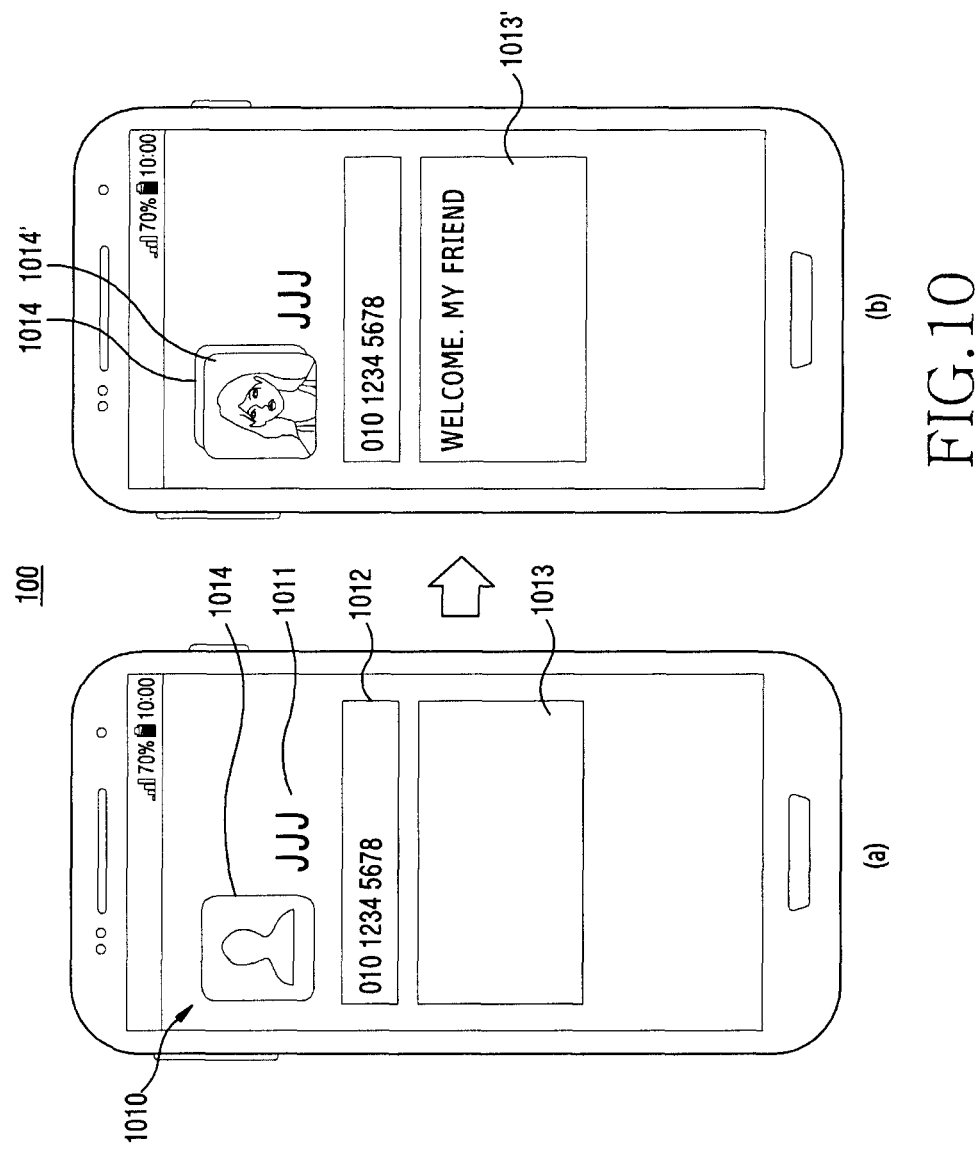
FIG. 10 is diagrams for explaining a situation of changing contact information based on received data when adding a new counterpart to a contact in an electronic device according to an embodiment of the present disclosure.

FIG. 10 is block diagrams for explaining a situation of changing contact information based on received data when adding a new counterpart to a contact in an electronic device according to an embodiment of the present disclosure.

Referring to FIG. 10(a), the electronic device 100 may display a fourth user interface 1010 of inputting new detailed information of a contact. The fourth user interface 1010 may, for example, include a contact image 1014, a contact name 1011, a contact phone number 1012, and a phrase 1013 input by the contact.

By using the fourth user interface 1010, a user may input new detailed information of a contact that is desired to be added. For example, the user may input the contact name 1011 and/or the contact phone number 1012.

If the electronic device 100 according to an embodiment receives data including information changed by a counterpart such as the aforementioned first data or second data by communicating with the server 200, the electronic device 100 may add the received information to the fourth user interface 1010, or change the received information to display the changed information.

Referring to FIG. 10(b), the electronic device 100 may display detailed information of a contact received from the server 200.

According to an exemplary embodiment, the electronic device 100 may display a contact image 1014' received when the contact inputs an image in region 154. For example, the electronic device 100 may superpose the received counterpart image 1014' on the existing image 1014 and display the superposed counterpart image 1014'.

Also, the electronic device 100 may display a phrase 1013' input by the contact in region 153. For example, the electronic device 100 may display the received phrase 1013' when no previous content is inputted to the region 1013.

As above, according to an exemplary embodiment of the present disclosure, the electronic device 100 may communicate with the server 200, to update information of users who utilize the same application by using information stored in the server 200, thereby maintaining so that the users may see the latest information all the time.

Figure 11:
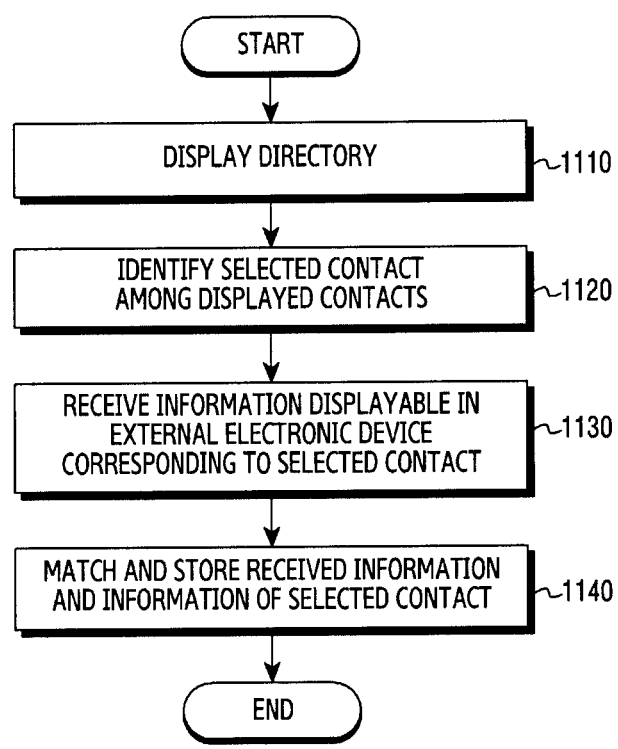
FIG. 11 is a flowchart of selecting a counterpart among a contact, and receiving information intended to be displayed and storing the same together with selected counterpart information in an electronic device according to an embodiment of the present disclosure.

FIG. 11 is a flowchart of selecting a counterpart among a contact, and receiving information intended to be displayed and storing the same together with selected counterpart information in an electronic device according to an exemplary embodiment of the present disclosure.

Referring to operation 1110, the electronic device 100 may display a directory. The directory may, for example, display a plurality of contacts, which in turn display a phone number, an e-mail address or the like, which has been stored in a list form. The directory may be an application which is installed when a manufacturing company of the electronic device 100 manufactures the electronic device 100. Also, the directory may be a contact list generated in a messenger application or SNS application that a user downloads and installs.

Referring to operation 1120, the electronic device 100 may identify a selected contact, based on a signal of selecting at least one or more contacts among the contact list displayed in the directory.

Referring to operation 1130, the electronic device 100 may receive information displayable in an external electronic device corresponding to the selected contact.

Referring to operation 1140, the electronic device 100 may match the received information with information of the selected contact, and store the matching result. For example, the electronic device 100 may match a phone number of the contact with a received phrase shown to the counterpart, and store the matching result.

As above, according to various embodiments of the present disclosure, a user may modify and input information intended to be displayed only to a desired contact. Due to this, the selected contact may identify user's information with a user's modified phrase and image through an external electronic device.

An electronic device 100 control a method according to an embodiment may include displaying a directory including at least one contact list, identifying a selected contact among the contact list based on an external input signal, receiving information to be displayed to the selected contact, and matching and storing the selected contact and the received information.

In the electronic device 100 control method according to an embodiment, the received information may be at least one of an image and a phrase which are shown to an external electronic device corresponding to the selected contact.

In the electronic device 100 control method according to an embodiment, receiving the information to be displayed to the selected contact may further include generating the information to be displayed to the contact, by using previously stored user's information.

An electronic device 100 control method according to an exemplary embodiment may include receiving information having been inputted such that a contact corresponding to an external electronic device is displayed in the electronic device, and when displaying a directory including the contact corresponding to the external electronic device, displaying the received information.

In the electronic device 100 control method according to an embodiment, receiving the information having been inputted such that the contact corresponding to the external electronic device is displayed in the electronic device may include receiving the information from the external electronic device, or receiving the information from another electronic device which has received the information from the external electronic device.

In the electronic device 100 control method according to an embodiment, displaying the received information may include displaying both the received information and previously stored information on the contact corresponding to the external electronic device, together.

The electronic device 100 control method according to an embodiment may include, when newly adding, to the directory, information of the contact corresponding to the external electronic device, receiving information having been inputted such that the contact corresponding to the external electronic device is displayed in the electronic device 100, and displaying the received information with the contact.

Figure 12:
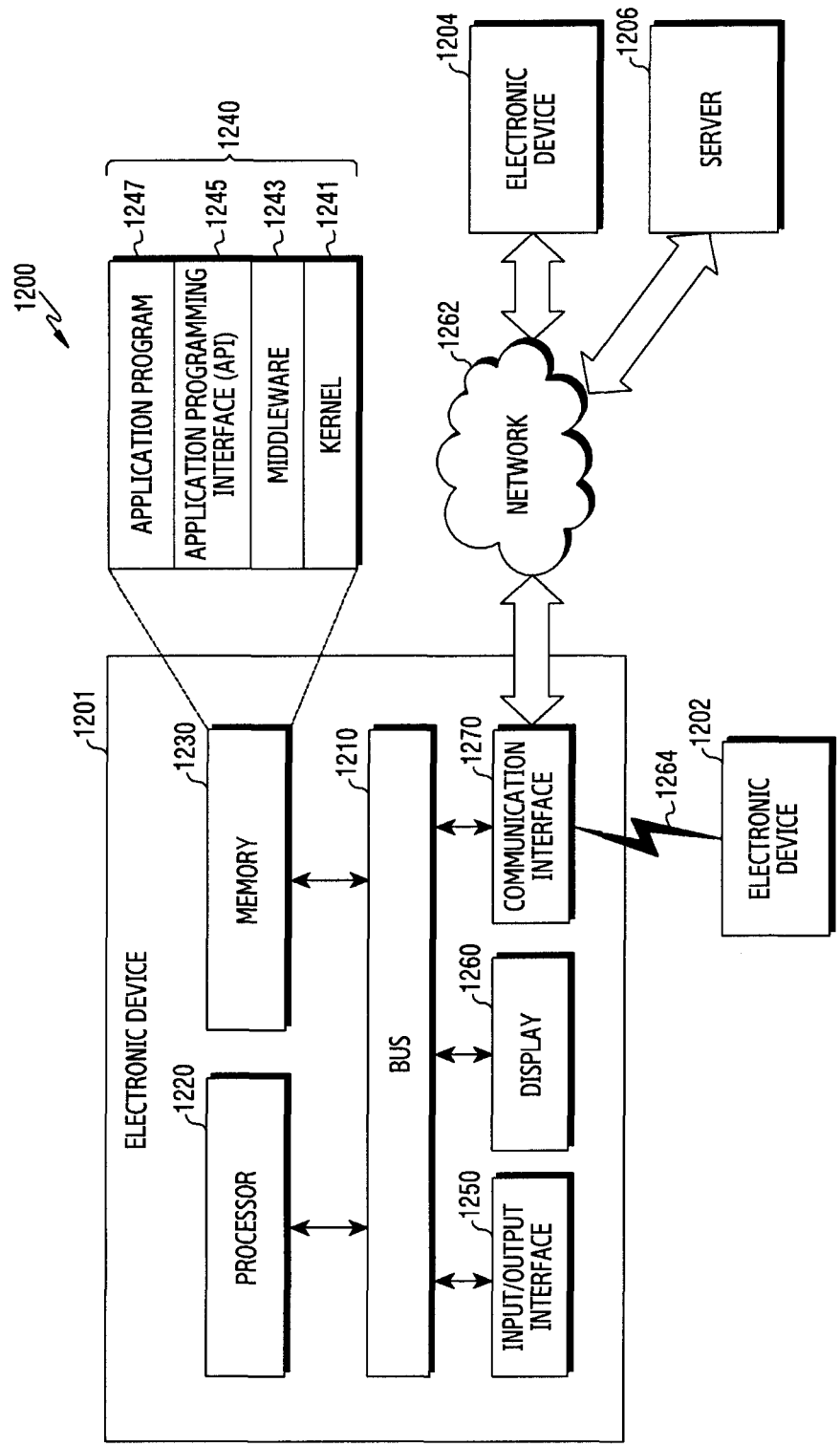
FIG. 12 is a diagram illustrating an electronic device within a network environment in various embodiments.

Referring to FIG. 12, an electronic device 1201 within a network environment 1200 in various exemplary embodiments is mentioned.

The electronic device 1200 may include the electronic device 100 of FIG. 1. The electronic device 1201 may include a bus 1210, a processor 1220, a memory 1230, an input output interface 1250, a display 1260, and a communication interface 1270. In some exemplary embodiment, the electronic device 1201 may omit at least one of the constituent elements or additionally have another constituent element. The bus 1210 may, for example, include a circuitry connecting the constituent elements 1210 to 1270 with one another and forwarding communication (e.g., a control message and/or data) between the constituent elements. The processor 1220 may include one or more of a central processing unit (CPU), an application processor (AP), or a communication processor (CP). The processor 1220 may, for example, execute an operation or data processing for control and/or communication of at least one another constituent element of the electronic device 1201.

The memory 1230 may include a volatile and/or non-volatile memory. The memory 1230 may, for example, store a command or data related to at least one another constituent element of the electronic device 1201. According to an exemplary embodiment, the memory 1230 may store a software and/or program 1240. The program 1240 may, for example, include a kernel 1241, a middleware 1243, an Application Programming Interface (API) 1245, an application program (or "application") 1247 and/or the like. At least some of the kernel 1241, the middleware 1243, or the API 1245 may be called an operating system (OS). The kernel 1241 may, for example, control or manage system resources (e.g., the bus 1210, the processor 1220, the memory 1230 or the like) which are used for executing operations or functions implemented in other programs (e.g., the middleware 1243, the API 1245, or the application program 1247). Also, the kernel 1241 may provide an interface capable of enabling the middleware 1243, the API 1245, or the application program 1247 to access the individual constituent element of the electronic device 1201, thereby controlling or managing the system resources of the electronic device 1201.

The middleware 1243 may, for example, perform a relay role of enabling the API 1245 or the application program 1247 to communicate and exchange data with the kernel 1241. Also, the middleware 1243 may process one or more work requests received from the application program 147 in accordance with priority. For example, the middleware 1243 may grant at least one of the application programs 1247 priority capable of using the system resources (e.g., the bus 1210, the processor 1220, the memory 1230 or the like) of the electronic device 1201, and process one or more work requests. The API 1245 is an interface enabling the application program 1247 to control a function provided by the kernel 1241 or the middleware 1243 and may, for example, include at least one interface or function (e.g., an instruction) for file control, window control, image processing, character control or the like. The input output interface 1250 may, for example, forward a command or data inputted from a user or another external device, to another constituent element(s) of the electronic device 1201, or output a command or data received from the another constituent element(s) of the electronic device 1201, to the user or another external device.

The display 1260 may, for example, include a liquid crystal display (LCD), a light emitting diode (LED) display, an organic light emitting diode (OLED) display, or a microelectromechanical systems (MEMS) display, or an electronic paper display. The display 1260 may, for example, display various contents (e.g., a text, an image, a video, an icon, a symbol and/or the like) to a user. The display 1260 may include a touch screen. And, for example, the display 310 may receive a touch, gesture, proximity, or hovering input that uses an electronic pen or a part of the user's body. The communication interface 1270 may, for example, establish communication between the electronic device 1201 and an external device (e.g., a first external electronic device 1202, a second external electronic device 1204, or a server 1206). For example, the communication interface 1270 may be connected to a network 1262 by a wireless communication or wired communication, to communicate with the external device (e.g., the second external electronic device 1204 or the server 1206).

The wireless communication may, for example, include a cellular communication that utilizes at least one of long term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM) or the like. According to an exemplary embodiment, the wireless communication may, for example, include wireless fidelity (WiFi), Bluetooth (BT), Bluetooth low energy (BLE), Zigbee, near field communication (NFC), magnetic secure transmission (MST), radio frequency (RF), or body area network (BAN). According to an exemplary embodiment, the wireless communication may include GNSS. The GNSS may, for example, be a global positioning system (GPS), a global navigation satellite system (Glonass), Beidou navigation satellite system (Beidou), or the European global satellite-based navigation system (Galileo). Below, in the present document, the "GPS" may be used interchangeably with the "GNSS". The wired communication may, for example, include at least one of a universal serial bus (USB), a high definition multimedia interface (HDMI), a recommended standard-232 (RS-232), power line communication (PLC), a plain old telephone service (POTS) or the like. The network 1262 may include a telecommunications network, for example, at least one of a computer network (e.g., local area network (LAN) or wide area network (WAN)), the Internet, or a telephone network.

The first and second electronic devices 1202 and 1204 each may be a device of the same or different type from that of the electronic device 1201. According to various exemplary embodiments, all or some of operations executed in the electronic device 1201 may be executed in another or a plurality of electronic devices (e.g., the electronic devices 102 and 104 or the server 1206). According to an exemplary embodiment, when the electronic device 1201 has to perform some function or service automatically or in response to a request, the electronic device 1201 may, instead of or additionally to executing the function or service in itself, request at least a partial function associated with this to another device (e.g., the electronic devices 1202 and 1204 or the server 1206). The another electronic device (e.g., the electronic devices 1202 and 1204 or the server 1206) may execute the requested function or additional function, and forward the execution result to the electronic device 1201. The electronic device 1201 may process the received result as it is or additionally, thereby providing the requested function or service. For this, a cloud computing, distributed computing, or client-server computing technology may be used, for example.

Figure 13:
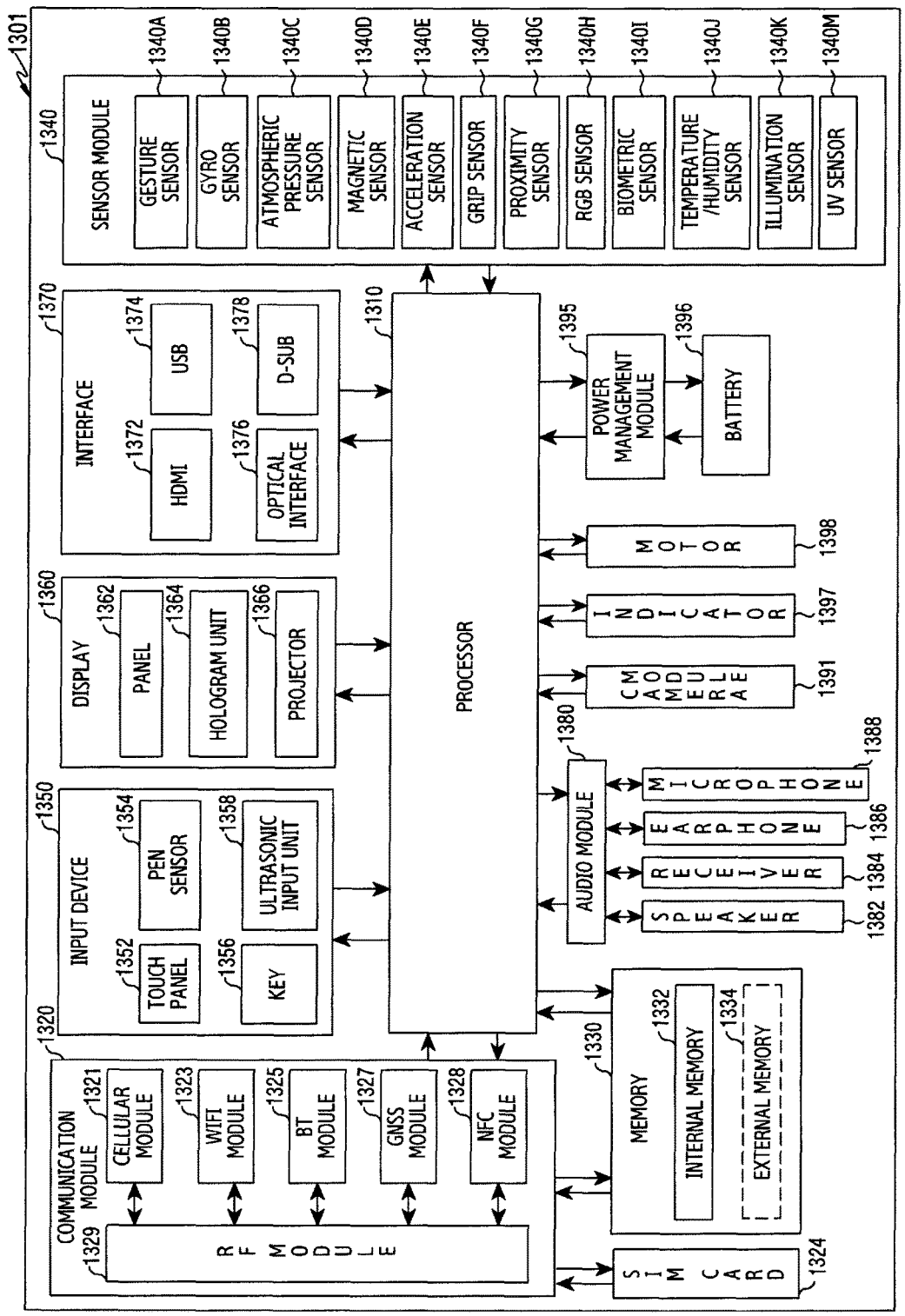
FIG. 13 is a block diagram of an electronic device according to various embodiments.

FIG. 13 is a block diagram of an electronic device 1301 according to various exemplary embodiments. The electronic device 1301 may, for example, include the whole or part of the electronic device 100 illustrated in FIG. 1 or the electronic device 1201 illustrated in FIG. 12. The electronic device 1301 may include one or more processors (e.g., AP) 1310, a communication module 1320, a subscriber identification module (SIM) 1324, a memory 1330, a sensor module 1340, an input device 1350, a display 1360, an interface 1370, an audio module 1380, a camera module 1391, a power management module 1395, a battery 1396, an indicator 1397, and a motor 1398. The processor 1310 may, for example, operate an operating system or an application program, to control a majority of hardware or software constituent elements connected to the processor 1310, and may perform various data processing and operations. The processor 1310 may be, for example, implemented as a system on chip (SoC). According to an exemplary embodiment, the processor 1310 may further include a graphic processing unit (GPU) and/or an image signal processor (ISP). The processor 1310 may include at least some (e.g., cellular module 1321) of the constituent elements shown in FIG. 2 as well. The processor 1310 may load, to a volatile memory, a command or data received from at least one of the other constituent elements (e.g., non-volatile memory) and process the loaded command or data, and store the result data in the non-volatile memory.

The communication module 1320 may have the same or similar construction with the communication interface 1270. The communication module 1320 may, for example, include a cellular module 1321, a WiFi module 1323, a Bluetooth module 1325, a GNSS module 1327, an NFC module 1328, and a radio frequency (RF) module 1329. The cellular module 1321 may, for example, provide voice telephony, video telephony, a text service, an Internet service or the like through a telecommunication network. According to an exemplary embodiment, the cellular module 1321 may perform the distinction and authentication of the electronic device 201 within the telecommunication network, by using the subscriber identification module (e.g., SIM card) 1324. According to an exemplary embodiment, the cellular module 1321 may perform at least some functions among functions that the processor 1310 may provide. According to an exemplary embodiment, the cellular module 1321 may include a Communication Processor (CP). According to some exemplary embodiment, at least some (e.g., two or more) of the cellular module 1321, the WiFi module 1323, the Bluetooth module 1325, the GNSS module 1327 or the NFC module 1328 may be included within one integrated chip (IC) or IC package. The RF module 1329 may, for example, transmit and/or receive a communication signal (e.g., an RF signal). The RF module 1329 may, for example, include a transceiver, a power amplifier module (PAM), a frequency filter, a low noise amplifier (LNA), an antenna or the like. According to another exemplary embodiment, at least one of the cellular module 1321, the WiFi module 1323, the Bluetooth module 1325, the GNSS module 1327 or the NFC module 1328 may transmit and/or receive an RF signal through a separate RF module. The subscriber identification module 1324 may, for example, include a card including a subscriber identification module or an embedded SIM. And, the subscriber identification module 224 may include unique identification information (e.g., integrated circuit card identifier (ICCID)) or subscriber information (e.g., international mobile subscriber identity (IMSI)).

The memory 1330 (e.g., the memory 1230 and the memory 330) may, for example, include an internal memory 1332 or an external memory 1334. The internal memory 1332 may, for example, include at least one of a volatile memory (e.g., a dynamic random access memory (DRAM), a static RAM (SRAM), a synchronous dynamic RAM (SDRAM) or the like), and/or a non-volatile memory (e.g., one time programmable read only memory (OTPROM), a programmable ROM (PROM), an erasable PROM (EPROM), an electrically EPROM (EEPROM), a mask ROM, a flash ROM, a flash memory, a hard drive, or a solid state drive (SSD)). The external memory 1334 may include a flash drive, for example, a compact flash (CF), a secure digital (SD), a micro-SD, a mini-SD, an extreme digital (xD), a multi-media card (MMC), a memory stick or the like. The external memory 1334 may be operatively or physically coupled with the electronic device 1301 through various interfaces.

The sensor module 1340 may, for example, measure a physical quantity or sense an activation state of the electronic device 1301, to convert measured or sensed information into an electrical signal. The sensor module 1340 may, for example, include at least one of a gesture sensor 1340A, a gyro sensor 1340B, a barometer 1340C, a magnetic sensor 1340D, an acceleration sensor 1340E, a grip sensor 1340F, a proximity sensor 1340G, a color sensor 1340H (e.g., a red, green, blue (RGB) sensor), a medical sensor 1340I, a temperature-humidity sensor 1340J, an illumination sensor 1340K, or an ultra violet (UV) sensor 1340M. Additionally or alternatively, the sensor module 1340 may, for example, include an e-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuitry for controlling at least one or more sensors belonging therein. In some exemplary embodiment, the electronic device 1301 may further include a processor configured to control the sensor module 1340, as a part of the processor 1310 or separately from the processor 1310, to control the sensor module 1340 while the processor 1310 is in a sleep state.

The input device 1350 may, for example, include a touch panel 1352, a (digital) pen sensor 1354, a key 1356, or an ultrasonic input device 1358. The touch panel 1352 may, for example, use at least one scheme among a capacitive overlay scheme, a pressure sensitive scheme, an infrared beam scheme, or an ultrasonic scheme. Also, the touch panel 1352 may further include a control circuitry as well. The touch panel 1352 may further include a tactile layer, to provide a tactile response to a user. The (digital) pen sensor 1354 may, for example, be a part of the touch panel 252, or include a separate sheet for recognition. The key 1356 may, for example, include a physical button, an optical key, or a keypad. The ultrasonic input device 1358 may sense an ultrasonic wave generated in an input tool through a microphone (e.g., microphone 1388), to identify data corresponding to the sensed ultrasonic wave.

The display 1360 (e.g., the display 1260 and the display 310) may include a panel 1362, a hologram device 1364, a projector 1366, and/or a control circuitry for controlling them. The panel 1362 may, for example, be implemented to be flexible, transparent, or wearable. The panel 1362 may be configured as one or more modules along with the touch panel 252. According to an exemplary embodiment, the panel 1362 may include a pressure sensor (or force sensor) capable of measuring a pressure intensity of a user's touch. The pressure sensor may be implemented as an integral type with the touch panel 1352, or be implemented as one or more sensors separate from the touch panel 1352. The hologram device 1364 may show a three-dimensional image to the air by using the interference of light. The projector 1366 may display an image by projecting light onto a screen. The screen may, for example, be disposed inside or outside the electronic device 1301. The interface 1370 may, for example, include an HDMI 1372, a USB 1374, an optical interface 1376, or a D-subminiature (D-sub) 1378. The interface 1370 may, for example, be included in the communication interface 1270 illustrated in FIG. 12. Additionally or alternatively, the interface 1370 may, for example, include a mobile high-definition link (MHL) interface, an SD card/multi-media card (MMC) interface, or an infrared data association (IrDA) standard interface.

The audio module 1380 may, for example, convert a sound and an electrical signal interactively. At least some constituent elements of the audio module 1380 may, for example, be included in the input output interface 1245 illustrated in FIG. 12. The audio module 1380 may, for example, process sound information that is inputted or outputted through a speaker 1382, a receiver 1384, an earphone 1386, the microphone 1388 or the like. The camera module 1391 is, for example, a device able to photograph a still image and a video image. According to an exemplary embodiment, the camera module 1391 may include one or more image sensors (e.g., front sensor or rear sensor), a lens, an image signal processor (ISP), or a flash (e.g., a LED, a xenon lamp, etc.). The power management module 1395 may, for example, manage power of the electronic device 1301. According to an exemplary embodiment, the power management module 1395 may include a Power Management Integrated Circuit (PMIC), a charger IC, or a battery or fuel gauge. The PMIC may employ a wired and/or wireless charging scheme. The wireless charging scheme may, for example, include a magnetic resonance scheme, a magnetic induction scheme, an electromagnetic wave scheme or the like. And, the wireless charging scheme may further include a supplementary circuitry for wireless charging, for example, a coil loop, a resonance circuitry, a rectifier or the like. The battery gauge may, for example, measure a level of the battery 1396, a voltage in charge, an electric current or a temperature. The battery 1396 may, for example, include a rechargeable battery and/or a solar battery.

The indicator 1397 may display a specific state (for example, a booting state, a message state, a charging state or the like) of the electronic device 1301 or a part (e.g., the processor 1310) of the electronic device 1301. The motor 1398 may convert an electrical signal into a mechanical vibration, and may generate a vibration, a haptic effect or the like. The electronic device 1301 may, for example, include a mobile TV support device (e.g., a GPU) capable of processing media data in compliance with the standards such as digital multimedia broadcasting (DMB), digital video broadcasting (DVB), mediaFlo' or the like. The constituent elements depicted in the present document may each consist of one or more components, and a name of the corresponding constituent element may be different according to the kind of an electronic device. In various exemplary embodiments, the electronic device (e.g., the electronic device 1301) may omit some constituent elements, or further include additional constituent elements, or combine and construct some of the constituent elements as one entity and identically perform functions of the corresponding constituent elements before combination.

Figure 14:
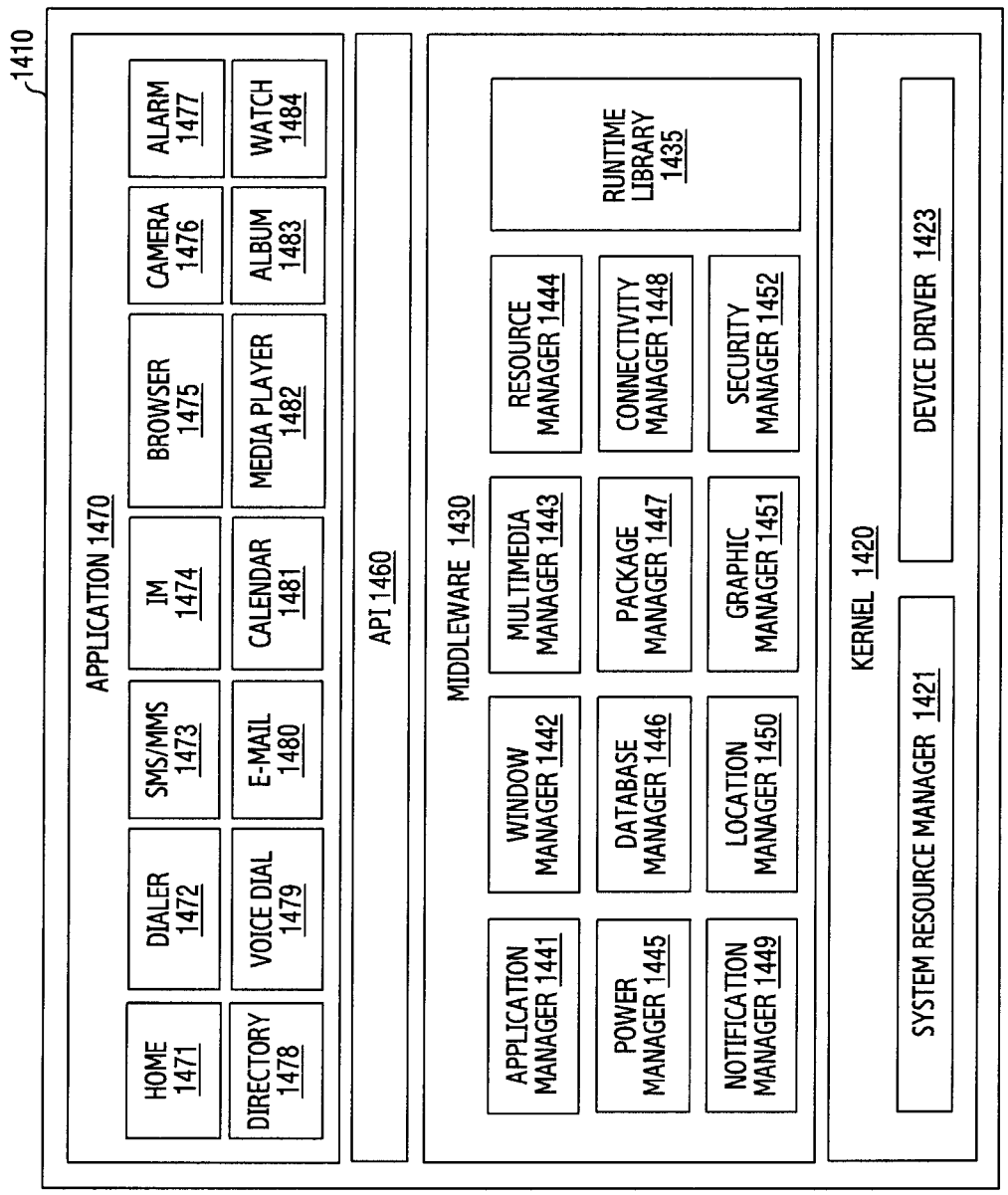
FIG. 14 is a block diagram of a program module according to various embodiments.

FIG. 14 is a block diagram of a program module according to various exemplary embodiments. According to an exemplary embodiment, the program module 1410 (e.g., the program 1240) may include an operating system (OS) controlling resources related to an electronic device (e.g., the electronic device 1201 and the electronic device 100), and/or various applications (e.g., the application program 1247) run on the operating system. The operating system may, for example, include Android™, iOS™, Windows™, Symbian™, Tizen™, or Bada™. Referring to FIG. 14, the program module 1410 may include a kernel 1420 (e.g., the kernel 1241), a middleware 1430 (e.g., the middleware 1243), an API 1460 (e.g., the API 1245), and/or an application 1470 (e.g., the application program 1247). At least a part of the program module 1410 may be preloaded onto an electronic device, or be downloaded from an external electronic device (e.g., the electronic device 1202 or 1204, the server 1206, etc.).

The kernel 1420 may, for example, include a system resource manager 1421 and/or a device driver 1423. The system resource manager 1421 may perform control of a system resource, allocation thereof, or recovery thereof. According to an exemplary embodiment, the system resource manager 1421 may include a process management unit, a memory management unit, or a file system management unit. The device driver 1423 may, for example, include a display driver, a camera driver, a Bluetooth driver, a shared memory driver, a USB driver, a keypad driver, a WiFi driver, an audio driver, or an inter-process communication (IPC) driver. The middleware 1430 may, for example, provide a function the application 1470 commonly needs, or provide various functions to the application 1470 through the API 1460 so that the application 1470 may make use of restricted system resources within an electronic device. According to an exemplary embodiment, the middleware 1430 may include at least one of a runtime library 1435, an application manager 1441, a window manager 1442, a multimedia manager 1443, a resource manager 1444, a power manager 1445, a database manager 1446, a package manager 1447, a connectivity manager 1448, a notification manager 1449, a location manager 1450, a graphic manager 1451, or a security manager 1452.

The runtime library 1435 may, for example, include a library module a compiler utilizes so as to add a new function through a programming language while the application 1470 is executed. The runtime library 1435 may perform input output management, memory management, or arithmetic function processing. The application manager 1441 may, for example, manage a lifecycle of the application 1470. The window manager 1442 may manage a GUI resource which is used for a screen. The multimedia manager 1443 may detect a format required for playing media files, and perform encoding or decoding of the media file by using a codec suitable to the corresponding format. The resource manager 1444 may manage a source code of the application 1470 or a space of a memory. The power manager 1445 may, for example, manage a battery capacity or a power source, and provide power information required for an operation of an electronic device. According to an exemplary embodiment, the power manager 1445 may interwork with a basic input/output system (BIOS). The database manager 1446 may, for example, generate, search or change a database to be used in the application 1470. The package manager 1447 may manage the installing or updating of an application that is distributed in the form of a package file.

The connectivity manager 1448 may, for example, manage wireless connectivity. The notification manager 1449 may, for example, provide an event such as an arrival message, an appointment, a proximity notification, etc. to a user. The location manager 1450 may, for example, manage location information of an electronic device. The graphic manager 1451 may, for example, manage a graphic effect to be provided to a user, or a user interface related with this. The security manager 1452 may, for example, provide system security or user authentication. According to an exemplary embodiment, the middleware 1430 may include a telephony manager for managing a voice or video telephony function of an electronic device, or a middleware module capable of forming a combination of functions of the aforementioned constituent elements. According to an exemplary embodiment, the middleware 1430 may provide a module specialized by type of an operating system. The middleware 1430 may dynamically delete some of the existing constituent elements, or add new constituent elements. The API 1460 is, for example, a set of API programming functions, and may be provided to have another construction in accordance with an operating system. For example, Android or iOS may provide one API set on a per-platform basis, and Tizen may provide two or more API sets on a per-platform basis.

The application 1470 may, for example, include a home 1471, a dialer 1472, a short message service (SMS)/multimedia message service (MMS) 1473, an instant message (IM) 1474, a browser 1475, a camera 1476, an alarm 1477, a directory 1478, a voice dial 1479, an electronic mail (e-mail) 1480, a calendar 1481, a media player 1482, an album 1483, a watch 1484, a health care (e.g., measuring a momentum, a blood sugar or the like), or an environment information (e.g., air pressure, humidity, or temperature information) provision application. According to an exemplary embodiment, the application 1470 may include an information exchange application capable of supporting information exchange between an electronic device and an external electronic device. The information exchange application may, for example, include a notification relay application for relaying specific information to the external electronic device, or a device management application for managing the external electronic device. For example, the notification relay application may relay, to the external electronic device, notification information generated from another application of the electronic device, or receive notification information from the external electronic device and provide the received notification information to a user. The device management application may, for example, install, delete, or update a function of the external electronic device (e.g., turn-on/turn-off of the external electronic device itself (or some constituent components) or adjustment of a brightness (or resolution) of a display) communicating with the electronic device, or an application operating in the external electronic device. According to an exemplary embodiment, the application 1470 may include an application (e.g., a health care application of a mobile medical instrument) designated according to an attribute of the external electronic device. According to an exemplary embodiment, the application 1470 may include an application received from an external electronic device. At least a part of the program module 1410 may be implemented (e.g., executed) by software, firmware, hardware (e.g., the processor 1310 and the processor 320), or a combination of at least two or more of them, and may include a module for performing one or more functions, a program, a routine, sets of instructions or a process.

In certain embodiments, directory 1478 can comprise a plurality of contacts, or may comprise a plurality of contacts groups, which in turn comprise a plurality of contacts. The directory 1478 can operate as described in FIGS. 1-11.

The term "module" used in the present document may include a unit comprising hardware, or hardware programmed with software, and may be, for example, used interchangeably with the term "logic", "logic block", "component", "circuitry" or the like. The "module" may be an integrally configured component or the minimum unit performing one or more functions or a part thereof. The "module" may be implemented mechanically or electronically, and may, for example, include an application-specific integrated circuit (ASIC) chip, a field-programmable gate array (FPGA), or a programmable logic device, which has been known or will be developed in future, performing some operations. At least a part of an apparatus (e.g., modules or functions thereof) or method (e.g., operations) according to various exemplary embodiments may be implemented as an instruction which has been stored in a computer-readable storage media in the form of a program module. When the instruction is executed by a processor (e.g., the processor 1220 and the processor 320), the processor may perform a function corresponding to the instruction. The computer-readable recording media may include a hard disk, a floppy disk, a magnetic media (e.g., a magnetic tape), an optical recording media (e.g., a compact disk-read only memory (CD-ROM) and/or a digital versatile disk (DVD)), a magneto-optical media (e.g., a floptical disk), an internal memory, etc. The instruction may include a code made by a compiler or a code executable by an interpreter.

As described above, an electronic device according to various exemplary embodiments may display a contact including at least one counterpart list, and identify a selected counterpart among the counterpart list based on an external input signal, and receive information which will be displayed to the selected counterpart, and match the selected counterpart with the received information, and store the matching result. Due to this, a user may input and manage user's information desired to be shown only to a specific counterpart.

A module or program module according to various exemplary embodiments may further include at least one or more of the aforementioned constituent elements, or omit some, or further include another constituent element. Operations carried out by a module, a program module or another constituent element according to various exemplary embodiments may be executed in a sequential, parallel, repeated or heuristic manner, or at least some operations may be executed in different order or may be omitted, or another operation may be added.

What is claimed is:

1. An electronic device comprising:
    a display;
    a memory storing instructions; and
    a processor operatively connected with the display and the memory,
    wherein, when executing the instructions, the processor is configured to:
    display a contact list with a plurality of objects respectively indicating a plurality of contacts which are stored, the plurality of contacts corresponding to a plurality of electronic devices,
    detect a first input to select at least one object among the plurality of objects,
    display, in response to the first input, a user interface (UI) for at least one contact indicated by the selected at least one object, the UI including a region for inputting a content to be displayed in at least one electronic device corresponding to the at least one contact among the plurality of electronic devices and another region for setting a displaying period that maintains the display of the content in the at least one electronic device,
    detect a second input for inputting the content to the region,
    detect a third input for setting the displaying period, and
    after detecting the second input and the third input, transmit first information regarding the content and second information regarding the displaying period to a server,
    wherein the first information and the second information are transmitted from the server to the at least one electronic device, wherein the content is displayed in the at least one electronic device receiving the first information from the server, and is switched to another content after displaying the content during the displaying period in the at least one electronic device, and wherein the another content has been displayed in all of the plurality of electronic devices.

2. The electronic device of claim 1, wherein the processor is configured to display the contact list as at least one group.

3. The electronic device of claim 1, wherein the processor is further configured to:
identify the content as a first content and a second content, and
identify the first content as the at least one content.

4. The electronic device of claim 3, wherein the first content comprises at least one name of the at least one contact or at least one phone number of the at least one contact.

5. The electronic device of claim 1, wherein the processor is further configured to store information including the first information and the second information as associated with the at least one contact.

6. The electronic device of claim 1, wherein the content comprises at least one of a phrase or an image.

7. A method for controlling an electronic device, the method comprising:
displaying a contact list with a plurality of objects respectively indicating a plurality of contacts which are stored, the plurality of contacts corresponding to a plurality of electronic devices,
detecting a first input to select at least one object among the plurality of objects,
displaying, in response to the first input, a user interface (UI) for at least one contact indicated by the selected at least one object, the UI including a region for inputting a content to be displayed in at least one electronic device corresponding to the at least one contact among the plurality of electronic devices and another region for setting a displaying period that maintains the display of the content in the at least one electronic device,
detecting a second input for inputting the content to the region,
detecting a third input for setting the displaying period, and
after detecting the second input and the third input, transmitting first information regarding the content and second information regarding the displaying period to a server,
wherein the first information and the second information are transmitted from the server to the at least one electronic device,
wherein the content is displayed in the at least one electronic device receiving the first information from the server, and is switched to another content after displaying the content during the displaying period in the at least one electronic device, and
wherein the another content has been displayed in all of the plurality of electronic devices.

8. The control method of claim 7, further comprising:
identifying the content as a first content and a second content, and
identifying the first content as the at least one content.

9. The control method of claim 8, wherein the first content comprises at least one name of the at least one contact or at least one phone number of the at least one contact.

10. A non-transitory recording medium for storing instructions of performing an electronic device control method, the non-transitory recording medium storing instructions comprising:
displaying a contact list with a plurality of objects respectively indicating a plurality of contacts which are stored, the plurality of contacts corresponding to a plurality of electronic devices,
detecting a first input to select at least one object among the plurality of objects,
displaying, in response to the first input, a user interface (UI) for at least one contact indicated by the selected at least one object, the UI including a region for inputting a content to be displayed in at least one electronic device corresponding to the at least one contact among the plurality of electronic devices and another region for setting a displaying period that maintains the display of the content in the at least one electronic device,
detecting a second input for inputting the content to the region,
detecting a third input for setting the displaying period, and
after detecting the second input and the third input, transmitting first information regarding the content and second information regarding the displaying period to a server,
wherein the first information and the second information are transmitted from the server to the at least one electronic device,
wherein the content is displayed in the at least one electronic device receiving the first information from the server, and is switched to another content after displaying the content during the displaying period in the at least one electronic device, and
wherein the another content has been displayed in all of the plurality of electronic devices.

* * * * *